(12) United States Patent
Janeke

(10) Patent No.: US 9,550,586 B2
(45) Date of Patent: Jan. 24, 2017

(54) APPARATUS AND METHODS FOR HYPERSONIC STOCHASTIC SWITCH

(71) Applicant: Charl E. Janeke, Los Angeles, CA (US)

(72) Inventor: Charl E. Janeke, Los Angeles, CA (US)

( * ) Notice: Subject to any disclaimer, the term of this patent is extended or adjusted under 35 U.S.C. 154(b) by 0 days.

(21) Appl. No.: 15/083,128

(22) Filed: Mar. 28, 2016

(65) Prior Publication Data
US 2016/0318634 A1    Nov. 3, 2016

Related U.S. Application Data

(63) Continuation-in-part of application No. 14/564,024, filed on Dec. 8, 2014, now Pat. No. 9,297,625, which is a continuation-in-part of application No. 14/313,976, filed on Jun. 24, 2014, now abandoned.

(60) Provisional application No. 61/838,754, filed on Jun. 24, 2013.

(51) Int. Cl.
| | |
|---|---|
| *B64C 1/38* | (2006.01) |
| *B64G 1/62* | (2006.01) |
| *F25J 3/02* | (2006.01) |
| *F25D 3/10* | (2006.01) |

(52) U.S. Cl.
CPC . *B64G 1/62* (2013.01); *F25D 3/10* (2013.01); *F25J 3/029* (2013.01)

(58) Field of Classification Search
USPC ................................. 244/130, 1 N
See application file for complete search history.

(56) References Cited

U.S. PATENT DOCUMENTS

| | | | | |
|---|---|---|---|---|
| 5,354,017 A * | 10/1994 | Levich | ................... | B64C 23/00 244/130 |
| 5,591,947 A * | 1/1997 | Andreou | ................ | B01D 59/34 204/157.22 |
| 5,934,622 A * | 8/1999 | Meng | ........................ | B63B 1/34 244/130 |
| 6,247,671 B1 * | 6/2001 | Saeks | ..................... | B64C 23/005 244/130 |
| 6,332,593 B1 * | 12/2001 | Kamiadakis | .......... | B64C 23/005 244/130 |
| 8,074,938 B2 * | 12/2011 | Hyde | ....................... | B64C 21/10 244/130 |
| 8,657,237 B2 * | 2/2014 | Schulein | ................. | B64C 21/02 244/130 |
| 2005/0106017 A1 * | 5/2005 | Segota | .................... | B63B 1/248 416/1 |
| 2015/0336659 A1 * | 11/2015 | Zhong | .................... | B64C 21/10 244/130 |

* cited by examiner

*Primary Examiner* — Christopher P Ellis
(74) *Attorney, Agent, or Firm* — J. Curtis Edmondson; Law Offices of J Curtis Edmondson

(57) ABSTRACT

An apparatus and method for mitigating the shock front of a rocket or aerospace plane flying at hypersonic speeds while simultaneously distilling liquid chemical elements from the ambient air. The ensuing supercool/chilled air that is rendered as a consequence of supercooling may hence be compressed, regeneratively intercooled & flashed into liquid air. By means of extension, liquid air may be rendered as a direct result of said supercooling throughout the hypersonic regime into space. Also described are the details of an isentropically expanded hypersonic stochastic switch (a singularity), which is mainly achieved via the addition of a high pressure supersonic isentropic expansion nozzle whereby a continuous flow continuum is transformed into a stochastic flux.

17 Claims, 13 Drawing Sheets

APPARATUS AND METHODS FOR HYPERSONIC STOCHASTIC SWITCH

CROSS REFERENCE TO RELATED APPLICATIONS

The present application claims the benefit of U.S. Utility patent application Ser. No. 14/564,024, filed on Aug. 12, 2014 and entitled "Apparatus and Methods for Hypersonic Nosecone", U.S. Utility patent application Ser. No. 14/313,976, filed on Jun. 24, 2014 and entitled "Thermally Conductive Hypersonic Nosecones" and U.S. Provisional Patent Application No. 61/838,454, filed on Jun. 24, 2013 and entitled "Hypersonic Vortex Tube," which is herein incorporated by reference in its entirety.

BACKGROUND

This inventive subject matter relates to the systems, apparatus, and methods for the reduction of drag in a spacecraft or missiles and a hypersonic stochastic switch. The reduction of drag in spacecraft and missiles is of particular concern as atmospheric friction can cause the nosecone to increase beyond the failure point. Clearly ways to reduce would benefit missiles, allowing them to travel at higher speeds, and spacecraft, allowing them to reenter the atmosphere without the fear of destruction. Also described are the details of an isentropically expanded hypersonic stochastic switch (a singularity), which is mainly achieved via the addition of a high pressure supersonic isentropic expansion nozzle.

SUMMARY OF THE INVENTION

The invention comprises the systems, apparatus, and methods for the reduction of drag in a missile using a vortex tube.

Illustrated herein is a method for reducing drag at hypersonic speed that includes the steps of mounting a liquefaction nosecone on the forward portion of a projectile; where the projectile is either a missile or spacecraft.

Further describes is a method for reducing drag at hypersonic speed also having the steps of drawing an atmosphere external to the liquefaction nose cone an intake aperture or a discharge shaft.

Further presented is a method for achieving hypersonic transport that has an aerospace plane intercontinental hypersonic airliner equipped with a hypersonic vortex generator in support turbojet powered hypersonic means.

Further presented are the details of an isentropically expanded hypersonic stochastic switch, which is mainly achieved via the addition of a high pressure supersonic isentropic expansion nozzle.

This specification is not limited to a single embodiment, rather the methods and systems presented should be construed broadly and further incorporate the material presented in the drawings.

DETAILED DESCRIPTION

Figure 1:
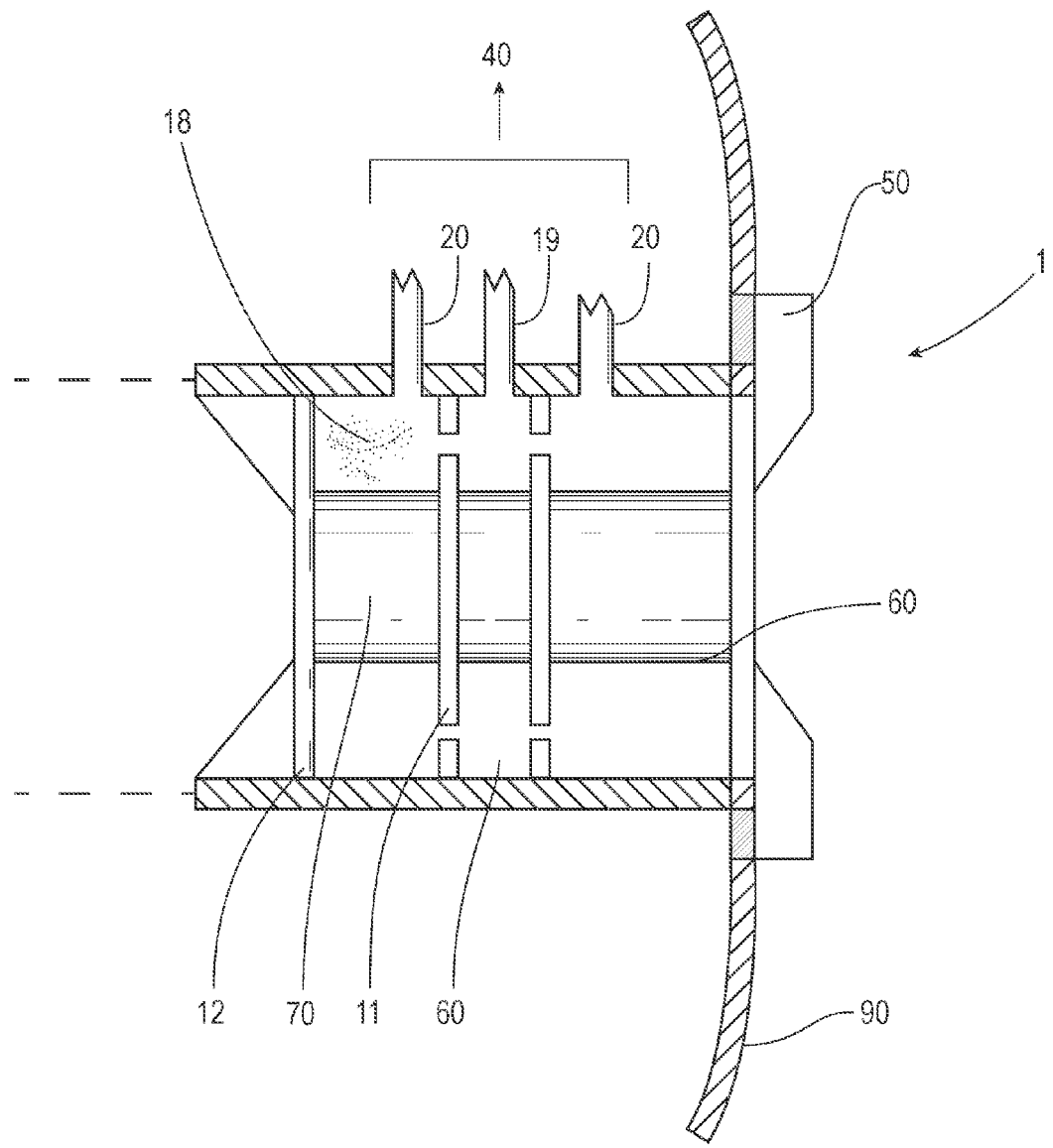
FIG. 1 illustrates the hypersonic nose cone.

Referring to FIG. 1 which illustrates the components of the conductive nose cone 1. A cooling fluid 18, typically liquid nitrogen, circulates by injection by the input line 19 into the shaft 60, and exiting via the exit lines 20. The cooling fluid 18 is provided by the cooling fluid source 40. Inside the shaft 60, is a space for the cooling fluid 18. A perforated Teflon washer 11, glass tube 12, laser aiming point 13 and thermocouple sensor probe 14. The incoming hypersonic streamline 17 is instantaneously transformed into a rotation vector as a consequence of rapid harmonic/isothermal compression surges on the reaction plane 112. The thermally conductive cone 1 is composed of a tip 50, a shaft 60, and a bore 70. The entry part of the tip 50 has an intake area that is larger in circumference that the bore 70. The angle of intake area is approximately 30-60 degrees relative to a line drawn in parallel with the bore edge. In a representative embodiment, the intake bore shaft is 5/16 inches and the outer area of the intake is 14/16 inches. Adjusting the scale of the entire apparatus will not affect the ability of the device to reduce drag.

Figure 2:
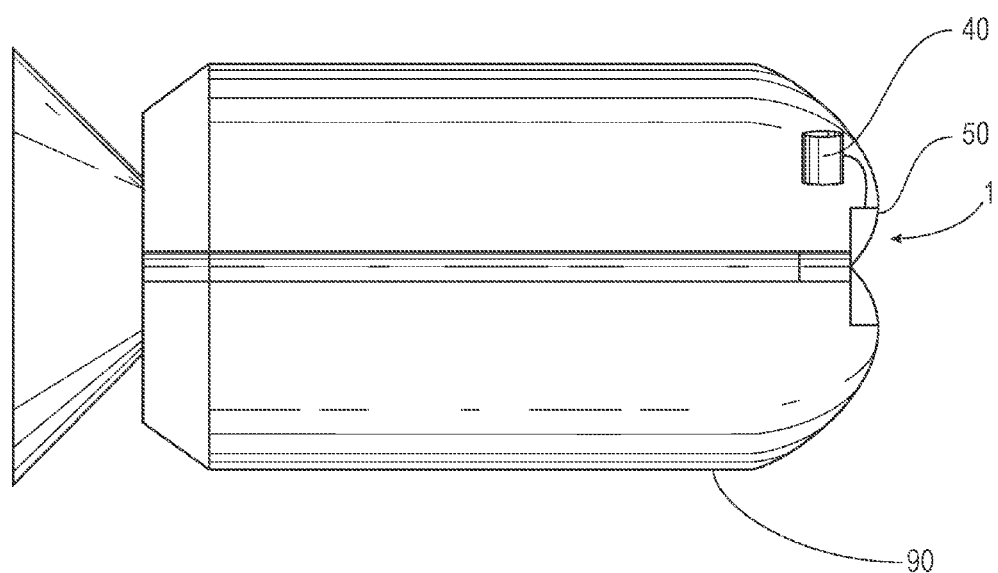
FIG. 2 illustrates the configuration on a hypersonic nose cone on a missile.

Now referring to FIG. 2 which illustrates a single or multi-stage missile or rocket 90 with a thermally conductive cone 1 based on the double helix vortex phenomenon driven by a rapid isothermal compression surges on the reaction plane.

Figures 3A, 3B:
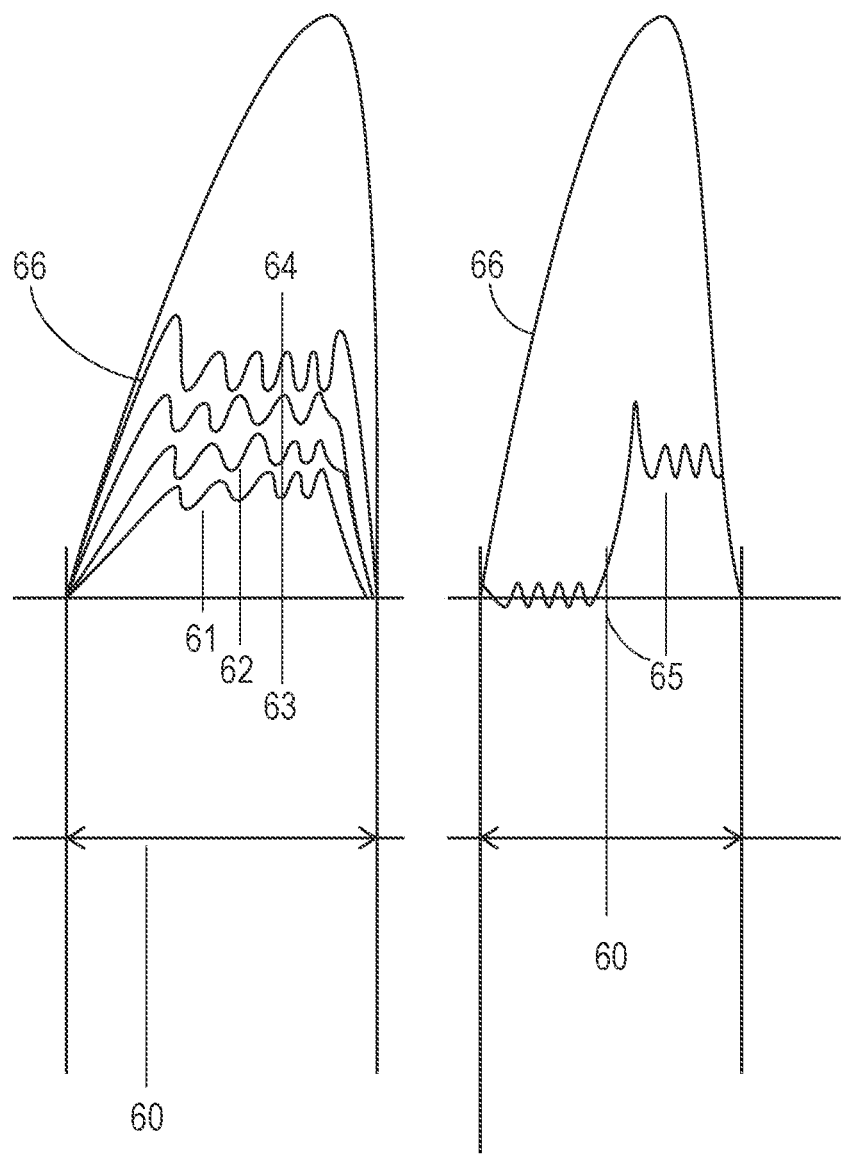
FIGS. 3A and 3B illustrates a schematic rendering of the stagantion pressure surges.

Now referring to FIGS. 3A and 3B which illustrates a schematic rendering of the stagnation pressure surges. Pressure surges 61,62,63,64 denotes the stagnation transients for the 30/45/60 degree (60/90/120 degree enclosed angle) ablative shear/reaction planes chilled to −160 C. Pressure surge 65 denotes the pressure surge with −25 C chilling only. Whereas traces 61,62,63,64 which demonstrate the consequence of hypersonic liquefaction and shows an immediate surge responses trace 65 which indicated an initial inertia lag of 1 sec prior to defaulting into conformal stagnation surging. Time periods 60 and 66 denotes a 3 sec testing window and stagnation potential respectively.

Figure 4:
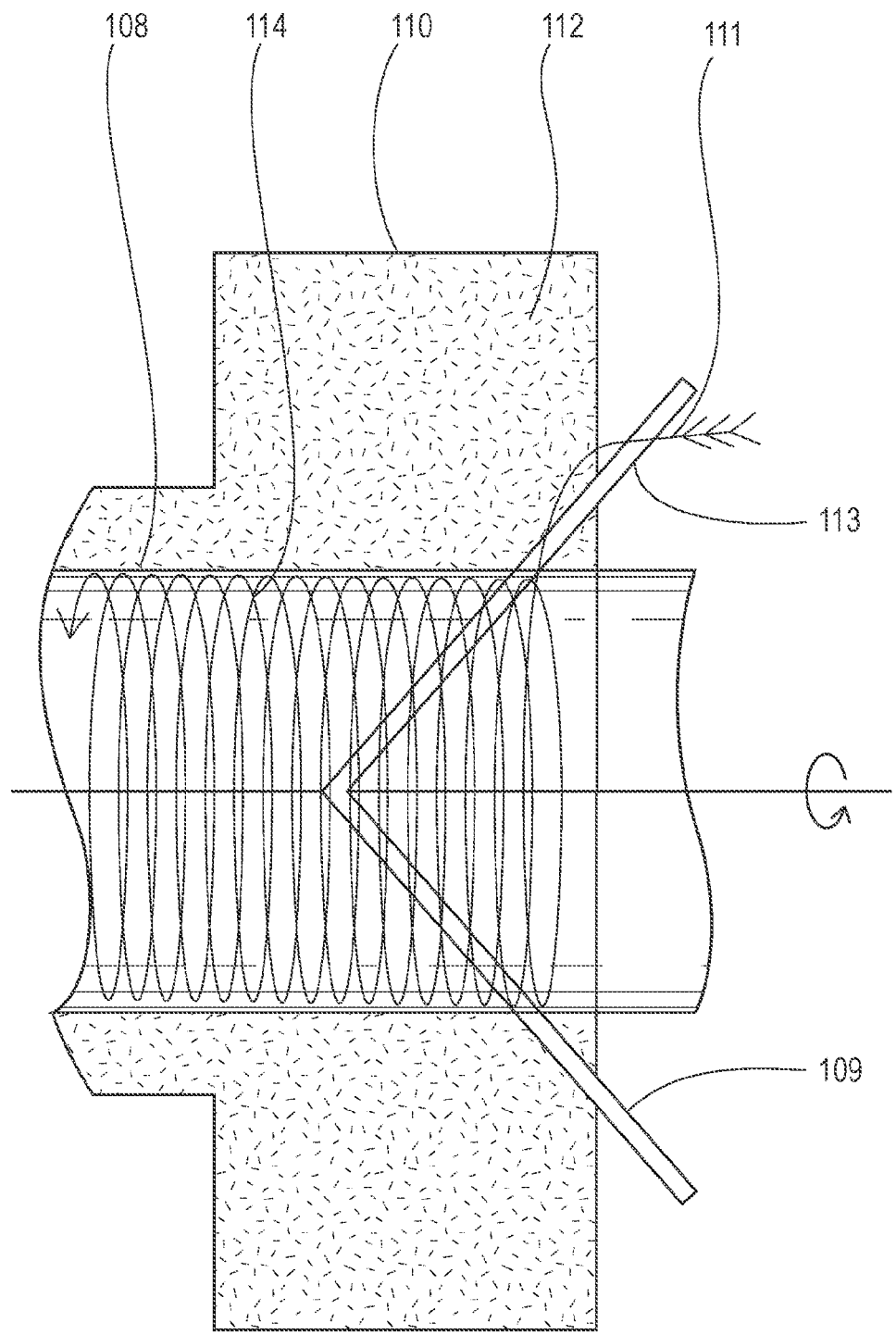
FIG. 4 illustrates the vortex triggering transformation.

Now referring to FIG. 4 which illustrates the vortex triggering transformation of the incipient hypersonic streamline 111 via the supercooled shear transformation plane 112 the nosecone 110 into a circular streamline 113. The subsequent developed vortex transgressing 114 down the supercooled bore 70. The coupling vector 109 is shown for reference purposes.

Figure 5A:
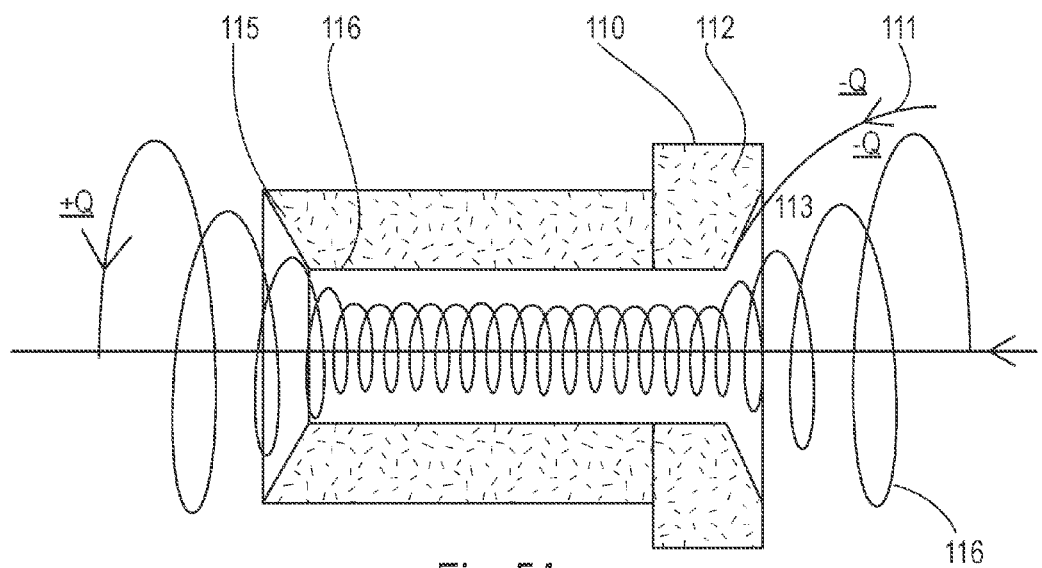
FIGS. 5A and 5B illustrates the transformation of the incipient shear vortex.
Figure 5B:
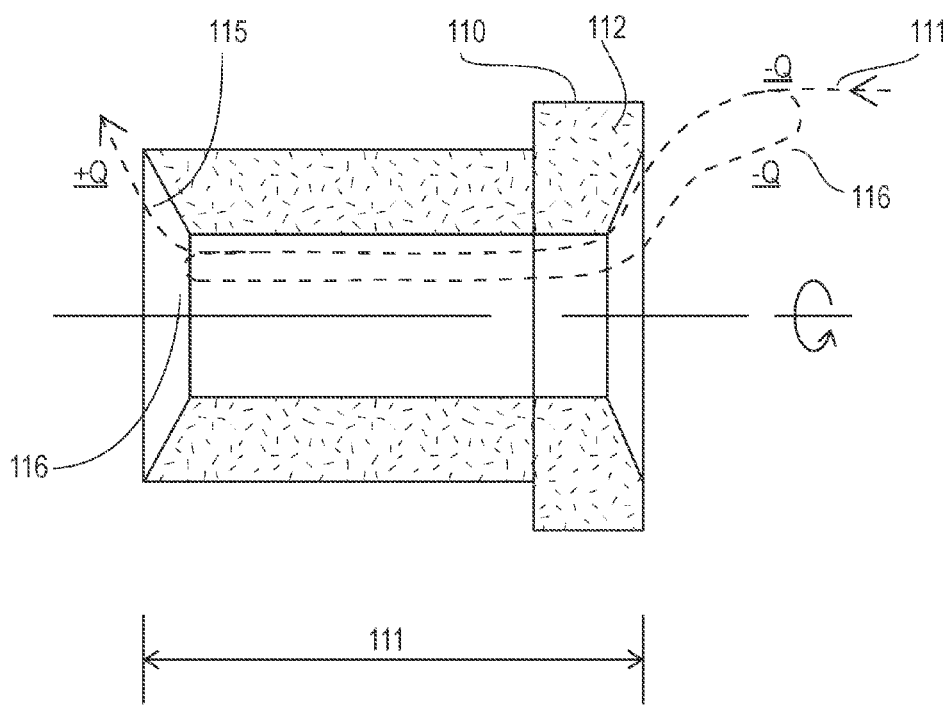

Now referring to FIGS. 5A and 5B, which illustrates the transformation of the incipient shear vortex item 115 ensuing from the shear transformation of the hypersonic streamline item 111 on the reaction plane item 112. The generation of the refractive (double helix) contraflow vortex item 116. FIG. 5A illustrates the vortex and FIG. 5B illustrates the flow pattern schematically.

Figure 6:
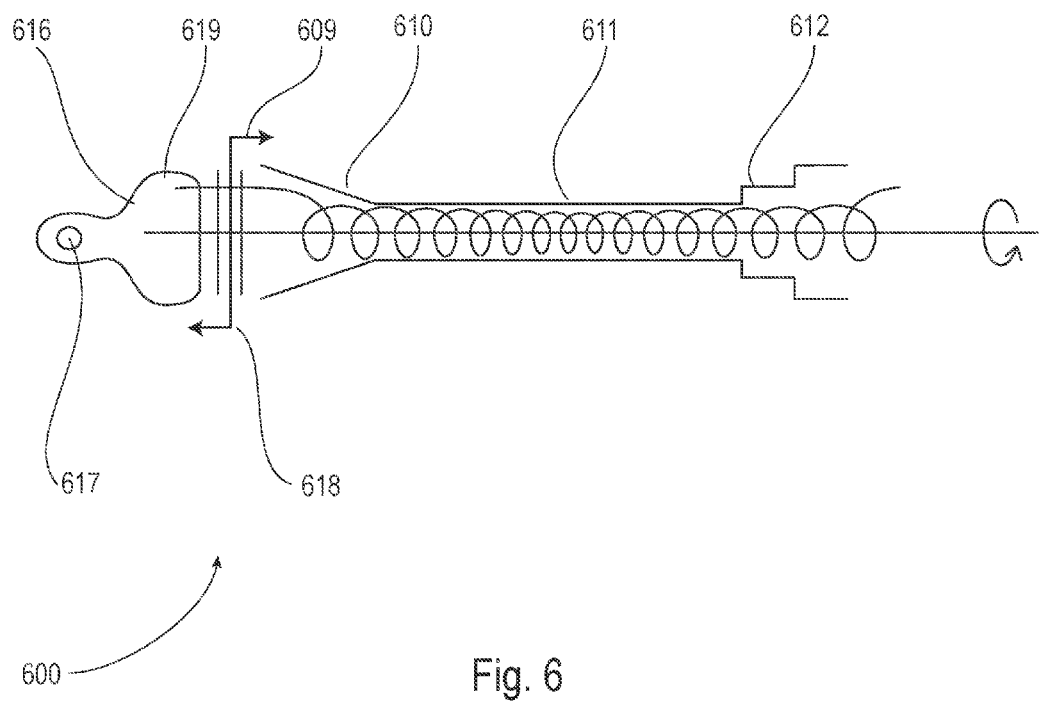
FIG. 6 illustrates isentropically expanded hypersonic stochastic switch.

Now referring to FIG. 6, 600 illustrates the details of an isentropically expanded hypersonic stochastic switch, which is mainly achieved via the addition of a high pressure supersonic isentropic expansion nozzle 616. The hypersonic front 609 engages with the thermally reactive slanted hypersonic vortex shaft 610 transforming the continuous supersonic flux into a complex stochastic vortex flux which is regeneratively chilled via Joule-Thomson throttling via expansion nozzle 612. By adding the isentropic expansion nozzle 616 with a high pressure helium resource 617 consequently by development and blasting high pressure helium 619. A mixtures of He or H2 or O2 or N2 or Ag or CO2 including atmospheric air singularly or collectively can be used in a continuous fashion into the thermally reactive slanted hypersonic vortex shaft 610, a supersonic singularity switch 618 is being generated whereby the linear hypersonic continuum is transformed into a non-linear stochastic vortex stream 611 and the hypersonic kinetic front into a gyrating stochastic stagnation-pressure flux that is regeneratively chilled via Joule-Thomson throttling via expansion nozzle 612.

Theoretically the stochastic LORENTZ stagnation pressure transformation in accordance with the IDEAL GAS LAW is $T2/T1=(p2/p1)^{(k-1)/k}$ where k=isentropic gas constant=1.4 (generally). By operation of the LORENTZ RH rule or the magnetic flux equivalent the stochastic stagnation pressure flux is being transformed into a gyrating thermal energy flux, which as a consequence of the transposed stochastically induced gyrations penetrating the saturation zone of Helium proximal to absolute zero. A mixture of He or H2 or O2 or N2 or Ag or CO2 including atmospheric air singularly or collectively can also be used to achieve similar results.

Figure 7:
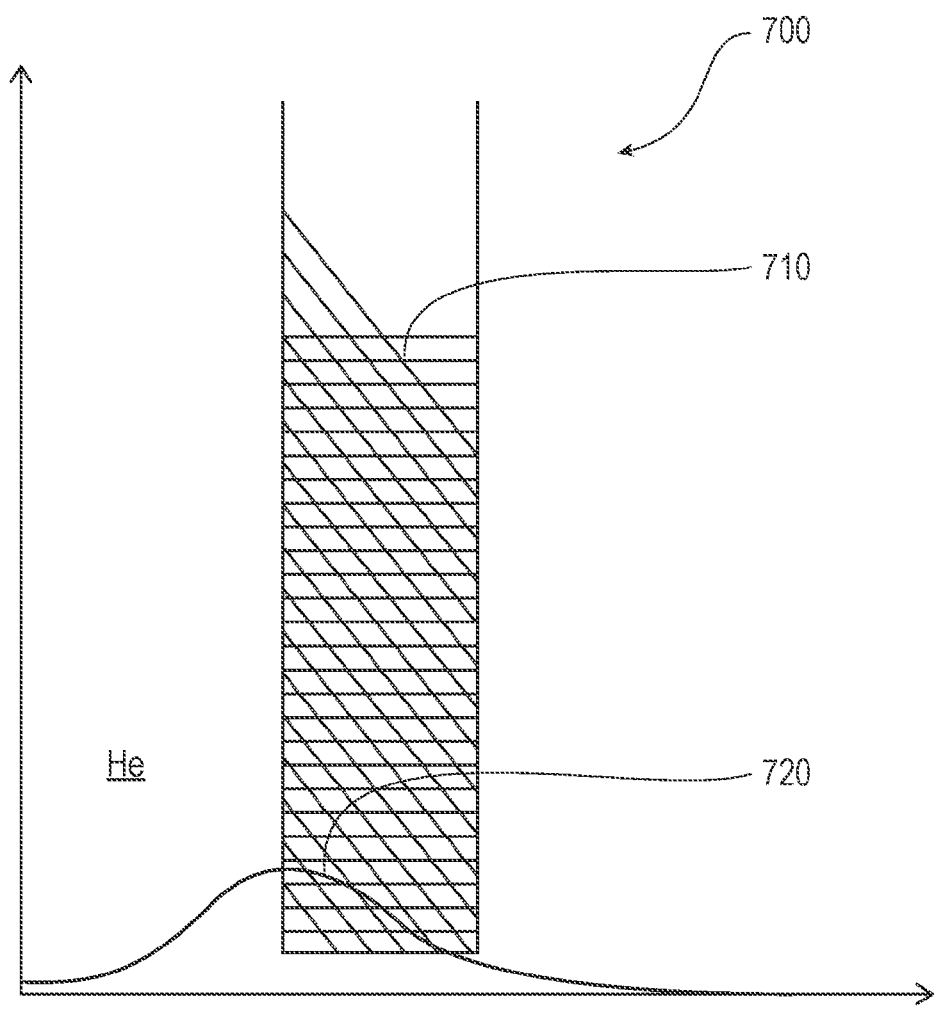
FIG. 7 illustrates homogenous helium liquefaction.

Now referring to FIG. 7, 700 illustrates Joule-Thomson throttling regression from 100K through saturation zone of Helium, subsequent to which complex Carnot liquefaction or refrigeration is being triggered. The regressive throttling from 100K described by 710 representing the entry point which is the isentropic expansion temperature being regressively chilled via Joule-Thomson throttling via expansion nozzles into the saturation zone of Helium @5K described by 720, whereupon liquefaction of Helium will trigger complex Carnot refrigeration deep into the Helium saturation zone as a consequence of induced stochastic switch gyrations penetrating the saturation zone of Helium.

Figure 8:
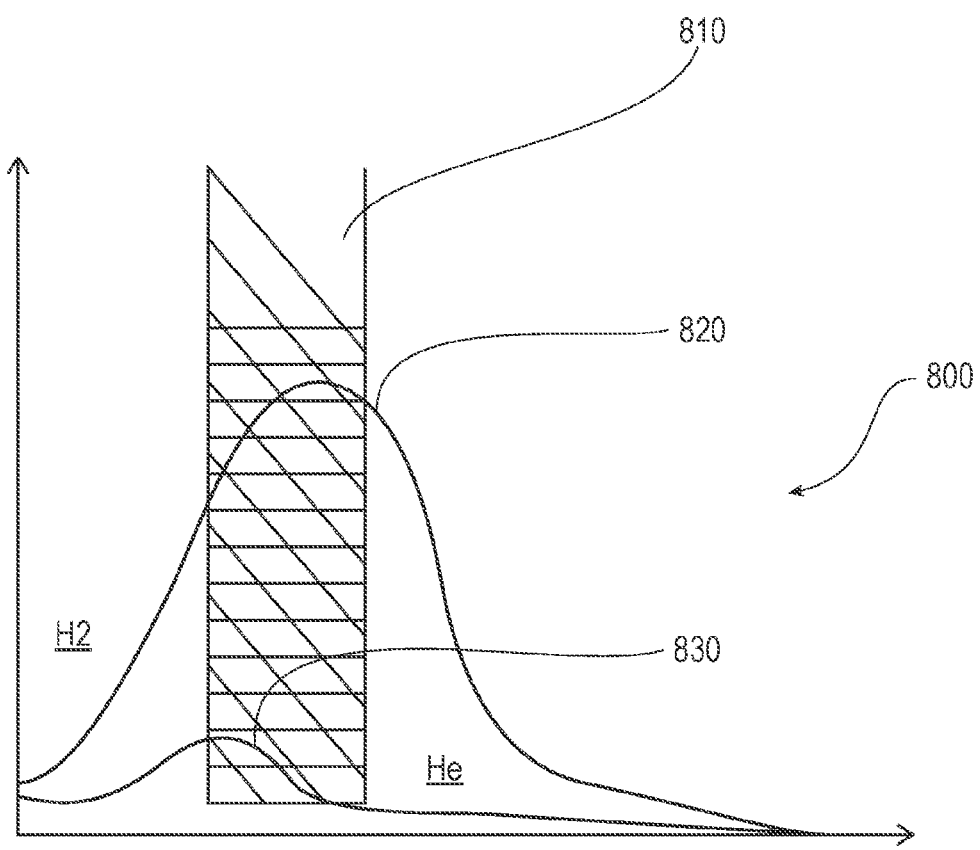
FIG. 8 illustrates homogenous helium and hydrogen liquefaction.

Now referring to FIG. 8, 800 illustrates Joule-Thomson throttling regression from 100K though saturation zone of hydrogen and helium consequentially to bypass the helium throttling dead zone through 30K by means of hydrogen throttling and liquefaction augmentation (1-5% preferred mixture). The regressive throttling from 100K described by 810 entry point for a mixture of Helium and Hydrogen (1-5% H2), whereby the Hydrogen is acting as catalyst/to accelerate Joule-Thompson throttling because of the extremely low Joule-Thomson coefficient through the 100K to 30K cryogenic zone which is likewise regressively chilled via Joule-Thomson throttling mixture of Hydrogen and Helium via expansion nozzles into the saturation zone of Hydrogen 820 @35K and consequently Helium @5K described by 830. Once into the Helium saturation zone liquefaction of Helium will initiate complex Carnot refrigeration deep into the Helium saturation zone. However Joule-Thomson throttling will accelerate substantively once the saturation zone of Hydrogen 820 is reached because of the combined power of hydrogen throttling and hydrogen complex Carnot chilling processes.

Figure 9:
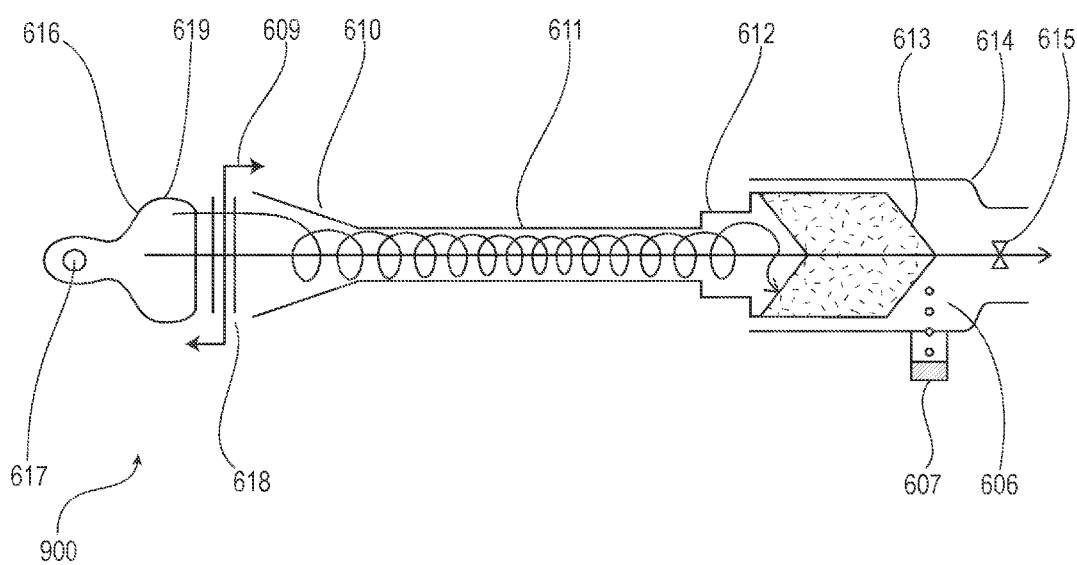
FIG. 9 illustrates Helium liquefaction scheme.

Now referring to FIG. 9, 900 represents a Helium liquefaction scheme by the addition of a porous core 613, enclosure 614 and vacuum pump 615 to vent the supercool vortex flux 609 through the porous plug to drive Joule-Thomson throttling into the vacuum range that will result in ZERO-K sub cooling that will generate liquid Helium 606 that will be captured in the cryo-flask 607. Theoretically throttling potential of dT=4 C @4K, Cp=2.8 and Hfq=10, 1 lb Helium will be able to liquefaction 4×2.8/10=1.12 lb Helium (meaning 2.12 lb compressed Helium @5,000 psi will have the capacity to liquefy 50% of itself back-to-back via the instant isentropic expansion and stochastic switch processes.

Figure 10:
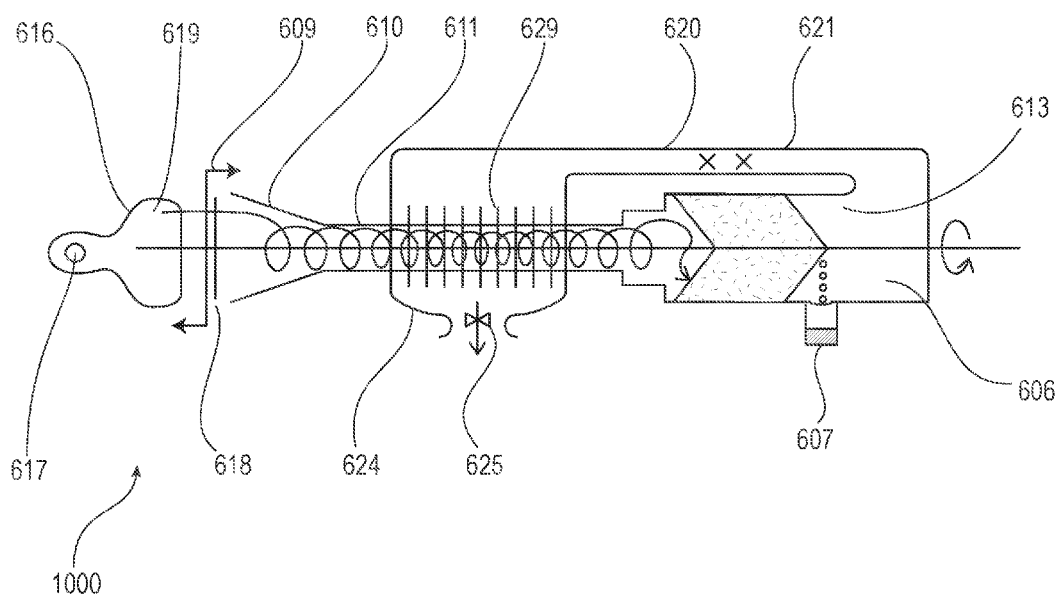
FIG. 10 illustrates the addition of regenerative loop.

Now referring to FIG. 10, 1000 illustrates the addition of regenerative loop 620 redirecting the Helium discharge 621 over the finned 629 choke shaft 611 that will boost Helium liquefaction by 25%, whereby 2.5 lb compressed Helium will generate 1.5 lb liquid Helium.

Figure 11A:
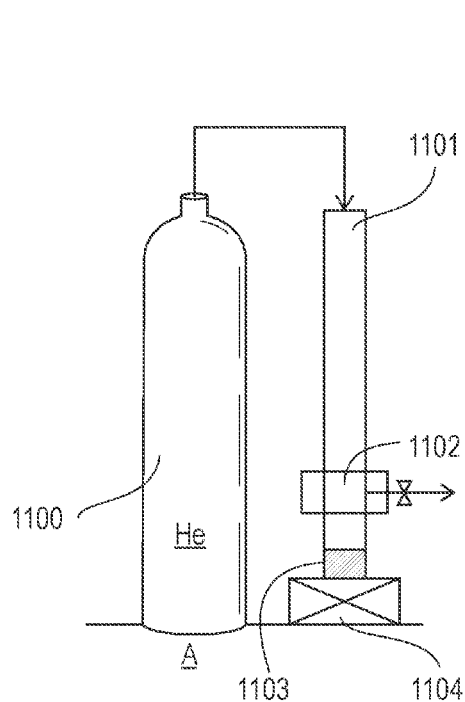
FIGS. 11A and 11B illustrates the setup for distillation.
Figure 11B:
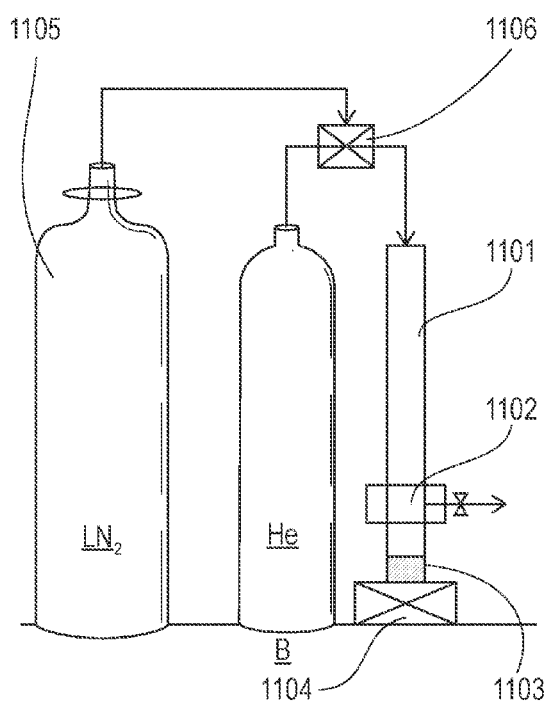

In accordance with FIGS. 11A and 11B compressed Helium tank 1100 supplies compressed Helium to the hypersonic Helium liquefaction vortex tube 1101 that is vented via vacuum pump 1102. Liquid Helium is consequently collected in cryo-container 1103 located on stand 1104. Optionally liquid Nitrogen (precool) tank 1105 and (precool) heat exchanger 1106 may also be added as shown in FIG. 11B.

Table-1 below illustrates the operation of Mach number (the isentropic driving potential) as to ABS-ZERO regression and liquid Helium liquefaction. Although isentropic expansion of Helium constitutes a powerful refrigeration engine, the saturation zone of Helium remains an enigma with and without liquid Nitrogen (LN2) precooling (100K) and/or Hydrogen (H2 and Helium mixtures (preferred mixture 1-5% Hydrogen). In order to bridge the continuous linear (isentropic) expansion threshold of 7.2K, in a hypersonic Vortex Tube whereby the continuous/linear (isentropic) front is transformed into a perfectly random (Gauss-Markov) harmonic flux whereby the (wild) stochastic (gyrations) strikes and penetrates the Helium saturation zone. Once the Helium saturation zone is entered, specifically "complex" Carnot refrigeration is triggered because it is a product of stochastic gyrations (which itself is the consequence of collapsing Helium liquefaction bubbles because of "gyrations" strikes). However once the complex Carnot engine activates, the isentropic regression is drawn into the Helium saturation zone by operation of the Hypersonic Vortex Tube. Therefore by switching linear/continuous flow into (wildly gyrating) a non-linear/stochasticflux by means of the Hypersonic Vortex Tube (a singularity), the power of stochastic gyrations are being utilized that bridges the ABS-ZERO divide and kick-starts Carnot refrigeration that turns the Hypersonic Vortex Tube into a Helium liquefaction engine.

TABULATION OF MACH NUMBER VS POTENTIAL PRESSURE ABS-ZERO REFRIGERATION $p/pt = [1 + (n-1)/2 \cdot M^2]^{-n/(n-1)}$    $To/Ti = (p/pt)^{(n-1)/n}$

| pt | Pr = pt/p | M | M | p | Ti | Ti | Ti | To | To | To | K | K | K |
|---|---|---|---|---|---|---|---|---|---|---|---|---|---|
| 5000 | 10 | M = | 2.9 | 500.0 | 300 | 250 | 100 | 155.3 | 129.4 | 51.8 | 5 | 4 | 3 |
| 5000 | 20 | M = | 3.3 | 250.0 | 300 | 250 | 100 | 127.4 | 106.1 | 42.5 | 5 | 4 | 3 |
| 5000 | 30 | M = | 3.5 | 166.7 | 300 | 250 | 100 | 113.4 | 94.5 | 37.8 | 5 | 4 | 3 |
| 5000 | 40 | M = | 3.7 | 125.0 | 300 | 250 | 100 | 104.5 | 87.0 | 34.8 | 5 | 4 | 3 |
| 5000 | 60 | M = | 3.9 | 83.3 | 300 | 250 | 100 | 93.0 | 77.5 | 31.0 | 5 | 4 | 3 |
| 5000 | 80 | M = | 4.1 | 62.5 | 300 | 250 | 100 | 85.7 | 71.4 | 28.6 | 5 | 4 | 3 |
| 5000 | 100 | M = | 4.2 | 50.0 | 300 | 250 | 100 | 80.4 | 67.0 | 26.8 | 5 | 4 | 3 |
| 5000 | 200 | M = | 4.7 | 25.0 | 300 | 250 | 100 | 65.9 | 54.9 | 22.0 | 5 | 4 | 3 |
| 5000 | 300 | M = | 5.0 | 16.7 | 300 | 250 | 100 | 58.7 | 48.9 | 19.6 | 5 | 4 | 3 |
| 5000 | 400 | M = | 5.2 | 12.5 | 300 | 250 | 100 | 54.1 | 45.1 | 18.0 | 5 | 4 | 3 |
| 5000 | 500 | M = | 5.3 | 10.0 | 300 | 250 | 100 | 50.7 | 42.3 | 16.9 | 5 | 4 | 3 |
| 5000 | 1000 | M = | 5.9 | 5.0 | 300 | 250 | 100 | 41.6 | 34.7 | 13.9 | 5 | 4 | 3 |
| 5000 | 2000 | M = | 6.6 | 2.5 | 300 | 250 | 100 | 34.1 | 28.4 | 11.4 | 5 | 4 | 3 |
| 5000 | 3000 | M = | 7.0 | 1.7 | 300 | 250 | 100 | 30.4 | 25.3 | 10.1 | 5 | 4 | 3 |
| 5000 | 4000 | M = | 7.3 | 1.3 | 300 | 250 | 100 | 28.0 | 23.3 | 9.3 | 5 | 4 | 3 |
| 5000 | 5000 | M = | 7.5 | 1.0 | 300 | 250 | 100 | 26.3 | 21.9 | 8.8 | 5 | 4 | 3 |
| 5000 | 6000 | M = | 7.7 | 0.8 | 300 | 250 | 100 | 24.9 | 20.8 | 8.3 | 5 | 4 | 3 |
| 5000 | 7000 | M = | 7.9 | 0.7 | 300 | 250 | 100 | 23.8 | 19.9 | 7.9 | 5 | 4 | 3 |
| 5000 | 8000 | M = | 8.0 | 0.6 | 300 | 250 | 100 | 23.0 | 19.1 | 7.7 | 5 | 4 | 3 |
| 5000 | 9000 | M = | 8.2 | 0.6 | 300 | 250 | 100 | 22.2 | 18.5 | 7.4 | 5 | 4 | 3 |
| 5000 | 10000 | M = | 8.3 | 0.5 | 300 | 250 | 100 | 21.5 | 17.9 | 7.2 | 5 | 4 | 3 |

Figure 12A:
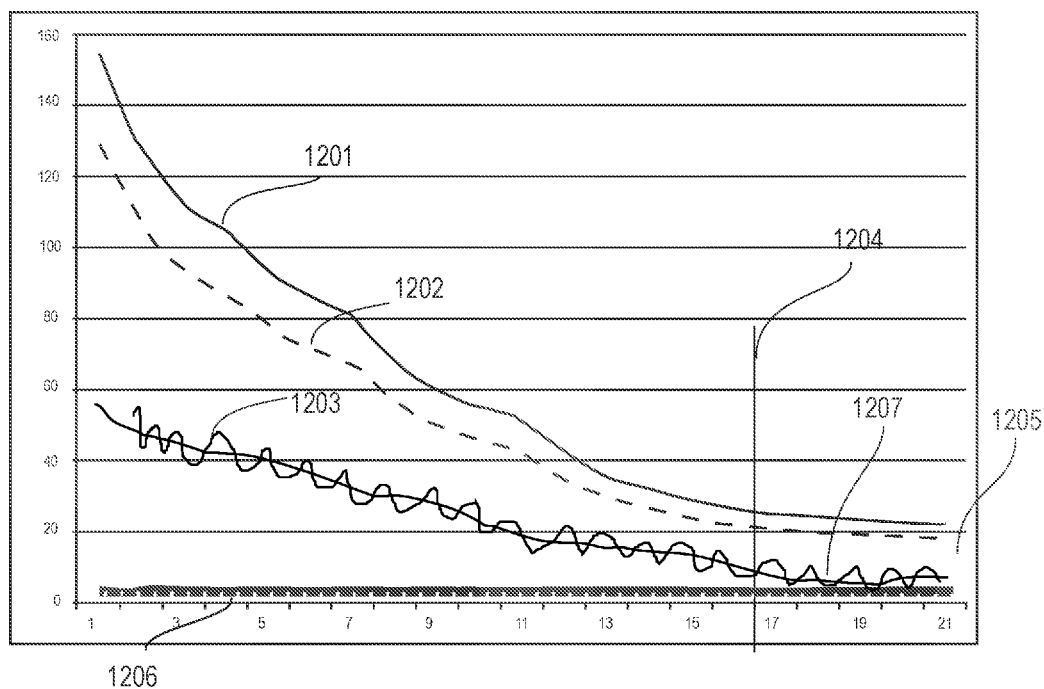
FIGS. 12A and 12B illustrates the chart of Mach number with ABS-ZERO refrigeration dynamics.
Figure 12B:
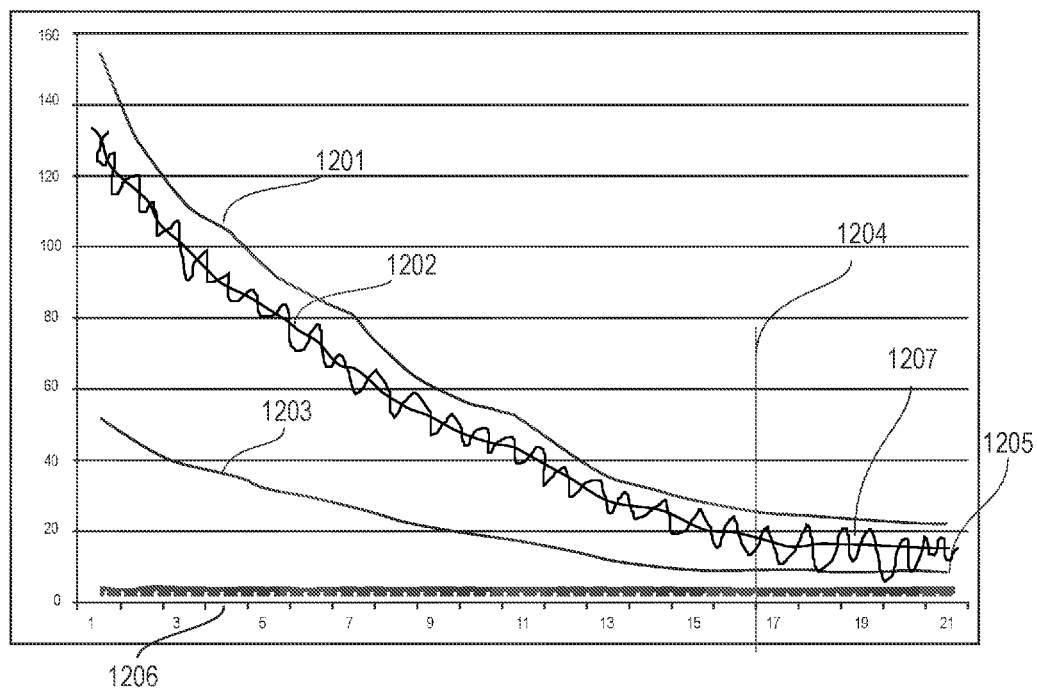

Now referring to FIGS. 12A and 12B, in general 1201 identifies a starting point of the regression trace which is 300K, 1202 refers to 250K (Freon refrigerated) and 1203 refers the 100K (LN2 precooled). 1204 indicates the Mach 7 threshold whereby 7.2K is ultimately feasible with LN2 precooling, isentropic expansion does not fall into the Helium saturation zone 1205 in isolation. Thus a hypersonic vortex tube is developed to bridge the ABS-ZERO gap by means of the stochastic gyrations 1206 that pierces the Helium saturation zone 1207 and consequential complex-Carnot quasi-saturation refrigeration power that spawns Helium liquefaction 1207. 1203 focuses on the power of liquid Nitrogen precooling/chilling (100K isentropic entry) and in 1202 focuses on Hydrogen mixing (1-5% hydrogen in helium). The hydrogen preferred ration is derived based on principles of latent heat of condensation and atmospheric oxygen content.

A hypersonic vortex tube stochastic Helium liquefaction switch may be utilized for small and large scale Helium liquefaction. Because liquid ABS-ZERO (super cooling) and enterprise Helium is a necessary modern research and enterprise tool, "Hypersonic Vortex Tube" and consequential stochastic Helium liquefaction switch will spawn new technologies and commerce advancements beyond the scope of modern realm. A freestanding thermally reactive nosecone comprising of isentropic hypersonic expansion nozzle wherein liquid helium is directly distilled out of compressed helium. The free standing thermally reactive nosecone is scaled as a personal helium distillation plant driven by tanked and compressed Helium and Liquid Nitrogen. The free standing thermally reactive nosecone is scaled as an enterprise Liquid Helium production facility with/without Liquid Nitrogen and with/without the addition of Hydrogen (preferred ratio 1-5%).

All patent and non-patent literature cited herein is hereby incorporated by references in its entirety for all purposes.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

The invention claimed is:

1. A thermally reactive nosecone mounted on a projectile for achieving hypersonic transport comprising:
   a high pressure supersonic isentropic expansion nozzle where liquid helium is directly distilled out of compressed helium resulting in an incipient shockwave being transformed into an isentropic flux via a stochastic switch.

2. The thermally reactive nosecone as described in claim 1, wherein the stochastic switch is a singularity switch whereby a linear continuum is transformed into a gyrating stagnation flux.

3. The thermally reactive nosecone as described in claim 1, wherein the singularity is a consequence of isothermal compression and hypersonic liquefaction of the incipient shockwave onto the thermally reactive nosecone.

4. The thermally reactive nosecone as described in claim 1, wherein the thermally reactive nosecone is regeneratively cooled via Joule-Thomson throttling and complex Carnot refrigeration at a discharge end of the thermally reactive nosecone.

5. The thermally reactive nosecone as described in claim 1, wherein the Joule-Thomson throttling and complex Carnot refrigeration is triggered via sudden expansion and porous plug integrated into the discharge end of the thermally reactive nosecone.

6. The thermally reactive nosecone as described in claim 1, wherein a portion of the stagnation flux and an extrinsic cryogenic resource is applied to precool the thermally reactive nosecone to supercharge the switching power of the shockwave piercing stochastic switch.

7. The thermally reactive nosecone as described in claim 1, wherein the extrinsic cryogenic resource to supercharge the switching power of the shockwave piercing stochastic switch is a liquid cryogenic propellant.

8. The thermally reactive nosecone as described in claim 1, wherein the thermally reactive nosecone is optimized for throttling and triggering complex Carnot refrigeration liquefaction of atmospheric oxygen to drive a rocket propulsion engine of a hypersonic transport.

9. The thermally reactive nosecone as described in claim 1, wherein an isentropic hypersonic expansion nozzle is applied to drive the thermally reactive nosecone as a cryogenic refrigeration apparatus.

10. The thermally reactive nosecone as described in claim 1, wherein the isentropic hypersonic expansion nozzle of the thermally reactive nosecone is optimized to distill liquid helium.

11. The thermally reactive nosecone as described in claim 1, wherein hydrogen in the range of 1-5% of helium is introduced into the isentropic expansion nozzle to boost the liquefaction capacity of liquid helium.

12. A freestanding thermally reactive nosecone comprising of isentropic hypersonic expansion nozzle wherein liquid helium is directly distilled out of compressed helium resulting in an incipient shockwave being transformed into an isentropic flux via a stochastic switch.

13. The free standing thermally reactive nosecone as described in claim 12 which is scaled as a personal helium distillation plant driven by tanked and compressed Helium and Liquid Nitrogen.

14. The free standing thermally reactive nosecone as described in claim 12 which is scaled as an enterprise Liquid Helium production facility with Liquid Nitrogen and with the addition of Hydrogen.

15. The free standing thermally reactive nosecone as described in claim 12 which is scaled as an enterprise Liquid Helium production facility without Liquid Nitrogen and without the addition of Hydrogen.

16. The free standing thermally reactive nosecone as described in claim 12 which is scaled as an enterprise Liquid Helium production facility with Liquid Nitrogen and with the addition of Hydrogen.

17. The free standing thermally reactive nosecone as described in claim 12 which is scaled as an enterprise Liquid Helium production facility without Liquid Nitrogen without the addition of Hydrogen.

* * * * *